United States Patent
Oh et al.

(10) Patent No.: US 8,500,566 B2
(45) Date of Patent: Aug. 6, 2013

(54) CROSS GROOVE TYPE CONSTANT VELOCITY JOINT

(75) Inventors: Seung Tark Oh, Ann Arbor, MI (US); Tae Hong Kim, West Bloomfield, MI (US)

(73) Assignee: Hyundai Wia Corporation (KR)

(*) Notice: Subject to any disclaimer, the term of this patent is extended or adjusted under 35 U.S.C. 154(b) by 438 days.

(21) Appl. No.: 12/702,757

(22) Filed: Feb. 9, 2010

(65) Prior Publication Data

US 2011/0070954 A1 Mar. 24, 2011

Related U.S. Application Data

(63) Continuation-in-part of application No. 12/563,029, filed on Sep. 18, 2009, and a continuation-in-part of application No. 12/582,602, filed on Oct. 20, 2009.

(51) Int. Cl.
*F16D 3/223* (2011.01)

(52) U.S. Cl.
USPC .......................................... 464/144; 464/906

(58) Field of Classification Search
USPC .............................. 464/144, 146, 906, 15, 140
See application file for complete search history.

(56) References Cited

U.S. PATENT DOCUMENTS

| | | | | |
|---|---|---|---|---|
| 2,046,584 A | * | 7/1936 | Rzeppa | 464/146 X |
| 2,322,570 A | * | 6/1943 | Dodge | 464/144 |
| 3,133,431 A | * | 5/1964 | Zech | 464/144 |
| 3,367,139 A | * | 2/1968 | Ristau | 464/144 |
| 4,995,853 A | * | 2/1991 | Schwarzler et al. | 464/144 |
| 5,026,325 A | * | 6/1991 | Welschof | 464/146 |
| 5,222,914 A | * | 6/1993 | Mazziotti | 464/144 |
| 5,531,643 A | | 7/1996 | Welschof | |
| 5,967,900 A | | 10/1999 | Tanigaki | |
| 6,071,195 A | | 6/2000 | Krude | |
| 6,159,103 A | | 12/2000 | Lu | |
| 6,227,979 B1 | * | 5/2001 | Yamamoto et al. | 464/144 X |
| 6,267,682 B1 | | 7/2001 | Sone et al. | |
| 6,431,988 B1 | | 8/2002 | Tone | |

(Continued)

FOREIGN PATENT DOCUMENTS

| | | | |
|---|---|---|---|
| DE | 102006058860 | * | 7/2008 |
| JP | 2006266329 A | * | 10/2006 |

*Primary Examiner* — Gregory Binda
*Assistant Examiner* — Matthieu Setliff
(74) *Attorney, Agent, or Firm* — Park & Associates IP Law, P.C.

(57) ABSTRACT

A constant velocity joint for a drive system comprises an outer joint member and an inner joint member each having a plurality of ball grooves in pairs for accommodating balls therein, the ball grooves consisting of a first group of grooves, each groove of which having a linear groove shape with no skew angle or a skewed groove shape with a relatively smaller skew angle, and a second group of grooves, each groove of which having a skewed groove shape with a relatively larger or regular skew angle. In addition to having the differentiated skew angles in the first and second groups of grooves, a taper angle is provided to the pair of grooves of at least one or both of the first and second groups of grooves in order to reduce the potential risk of ball locking in the grooves. In an alternative embodiment, all the grooves of the outer and inner joint members have a skewed groove shape with a skew angle which is less than the regular skew angle of the conventional cross groove joint, and a taper angle is provided to the pairs of grooves of the outer and inner joint members.

8 Claims, 9 Drawing Sheets

(a) (b)

U.S. PATENT DOCUMENTS

| | | | |
|---|---|---|---|
| 6,497,622 B1* | 12/2002 | Bilz et al. | 464/144 |
| 6,709,338 B2 | 3/2004 | Weckerling et al. | |
| 6,848,999 B2 | 2/2005 | Weckerling et al. | |
| 7,001,281 B2 | 2/2006 | Krude | |
| 7,008,326 B2 | 3/2006 | Song | |
| 7,112,140 B2 | 9/2006 | Weckerling | |
| 7,347,786 B2 | 3/2008 | Mondragon-Parra et al. | |
| 7,393,284 B2 | 7/2008 | Hassenrik et al. | |
| 7,396,285 B2 | 7/2008 | Weckerling | |
| 7,785,205 B2 | 8/2010 | Hayama | |
| 2007/0135221 A1* | 6/2007 | Une et al. | 464/144 |
| 2007/0259724 A1* | 11/2007 | Pohl | 464/144 |
| 2008/0085776 A1* | 4/2008 | Frost et al. | |
| 2010/0292016 A1* | 11/2010 | Wormsbaecher et al. | 464/144 |

* cited by examiner

Section A-A (a)　　　　　　　(b)　　　　　　　(c)

Section B-B (a)  (b)  (c)

(a)    (b)

(Section Y-Y)

(a)   (b)

(a)    (b)

CROSS GROOVE TYPE CONSTANT VELOCITY JOINT

REFERENCE TO RELATED APPLICATION

The present application claims priority, as a continuation-in-part application, on U.S. patent application Ser. No. 12/563,029, entitled "CROSS GROOVE TYPE CONSTANT VELOCITY JOINT WITH COMPOSITE GROOVE PATTERNS" and filed on Sep. 18, 2009, and U.S. patent application Ser. No. 12/582,602, entitled "CROSS GROOVE TYPE CONSTANT VELOCITY JOINT" and filed on Oct. 20, 2009, which were filed by the applicant and assigned to the same assignee as the present application, the contents of which are incorporated herein by reference in their entirety.

FIELD OF THE INVENTION

The present invention relates to a cross groove type constant velocity joint for use in a drive system, and more particularly, to a cross groove type constant velocity joint having composite groove shapes, typically for use in a drive system of, for example, an automobile for transmitting rotational torque between two rotating shafts thereof.

BACKGROUND OF THE INVENTION

A cross groove type constant velocity joint (hereinafter to be referred as a "cross groove joint") is one type of constant velocity universal joints used for transmitting rotational torque between the rotating shafts (i.e., the driving shaft and the driven shaft), typically for the drive system of automobiles. The cross groove joint includes an outer joint member with a plurality of ball grooves formed on the inner surface thereof, and an inner joint member with a plurality of ball grooves formed on the outer surface thereof, in which the corresponding ball grooves of the outer joint member and the inner joint member are configured to pair with each other and slanted with the same skew angle and in opposite directions with respect to the center or rotating axis of the joint.

FIGS. 1-2 illustrate one example of a conventional cross groove type joint which retains six balls in the ball grooves for transmitting the rotational torque between the outer and inner joint members to drive the drive system. This cross groove joint includes an outer joint member 1 with six grooves formed on the inner surface thereof, an inner joint member 3 with six grooves formed on the outer surface thereof, six balls 2 retained in the paired grooves of the outer and inner joint members for torque transfer between the outer and inner joint members 1 and 3, and a cage 4 configured to support the balls 2 to a plane bisecting the angle of articulation between the axes of rotation of the outer and inner joint members 1 and 3.

In the structure of the conventional cross groove joint as shown in FIG. 2, the outer joint member 1 has a plurality of (i.e., six) inwardly facing outer ball grooves 1a alternately skewed with a skew angle δ1 in opposite directions relative to an axis of rotation of the outer joint member 1. The inner joint member 3 positioned inside the outer joint member 1 has a plurality of (i.e., six) outwardly facing inner ball grooves 3a alternately skewed with a skew angle δ3 in opposite directions relative to an axis of rotation of the inner joint member 3. The outer and inner ball grooves 1a and 3a face each other in crossed pairs with each of the balls 2a positioned between each crossed pair for torque transfer between the inner and outer joint members 1 and 3. As the ball 2a is retained in the cage 4, the ball 2a is limited in a ball movement range L2 in the circumferential direction of the joint, and the outer joint member 1 has a minimum thickness L1 on one side of the member. To secure the movement of the balls 2a, the cage 4 includes a plurality of (i.e., six) cage windows 4a with a dimension sufficient to accommodate the ball movement L2. As a result, the width L4 of each cage web 4b must be designed to have a dimension at least the same or less than the minimum thickness L1 of outer joint member 1.

In an attempt to reduce a transmission error and to make the design of the joint more compact, the cross groove joints retaining eight balls have been suggested. The eight-ball type cross groove joint known in the art typically has a basic structure generally the same or similar to that shown in FIGS. 1-2, however, with the number of the balls and the number of the ball grooves of the outer and inner joint members respectively increased from six to eight. FIGS. 3(a) and (b) illustrate a conventional cross groove joint with eight balls. Like the six ball cross groove joint, the eight ball cross groove joint includes an outer joint member 11, an inner joint member 33, balls 22 for torque transfer between the outer and inner joint members, and a cage 44 configured to support the balls to a plane bisecting the angle of articulation between the axes of rotation of the outer and inner joint members.

In the structure of the conventional eight ball type cross groove joint as shown in FIG. 4, the outer joint member 11 has a plurality of inwardly facing outer ball grooves 11a alternately skewed with a skew angle δ11 in opposite directions relative to an axis of rotation of the outer joint member. The inner joint member 33 placed inside the outer joint member 11 similarly has a plurality of (i.e., eight) outwardly facing inner ball grooves 33a alternately skewed with a skew angle δ33, however, oriented in opposite directions relative to an axis of rotation of inner joint member 33. The outer and inner ball grooves 11a and 33a face each other in crossed pairs with each of the balls 22a retained between each crossed pair for torque transfer between the inner and outer joint members. As the ball 22a is retained in the cage 44, the ball 22 is limited in a ball movement range L22 in the circumferential direction of the joint, and the outer joint member 11 has a minimum (least) thickness L11 on one side of the member. To secure the movement of the balls 22, the cage 44 includes a plurality of (i.e., eight) cage windows 44a with a dimension sufficient to accommodate the ball movement L22. As a result, the width L44 of each cage web 44b must be designed to have a dimension the same or less than the minimum thickness L11 of outer joint member 11.

As the cross groove joint with higher balls (e.g., eight or more balls) can provide more compact design and secure a smoother and reliable operation as compared to the cross groove joint with six balls, it would be desirable to produce a higher ball (e.g., eight or more balls) type cross groove joint which has the same or enhanced durability as that retaining six balls. More specifically, if the cross groove joint with eight balls, for example, is designed to have the same pitch circle diameter (PCD) as the joint having six balls, the ball diameter of the eight ball joint can be reduced because the load on each ball groove and the stress onto the cage web 44b decreases by the increase of the number of the balls. In addition, the size of each cage window 44a can also be reduced as compared to the joint containing six balls.

However, the higher ball (e.g., eight ball) type cross groove joint may also include certain shortcomings or disadvantages as described below, for example. Because the eight ball type joint includes more (i.e., eight) cage windows 44a, the thickness of the cage web 44b is also reduced, and thus, the stress on the cage web 44b becomes greater than that of the six ball type. Comparing to the joint with six balls having the same PCD, the increased amount of stress on the cage web (due to the reduction of cage web thickness) exceeds that of the decreased amount of stress owing to the decrease of the ball size and increase of the number of balls. Therefore, the conventional cross groove joint of higher ball (e.g., eight ball) type may have a weakened strength and durability in the cage web, and thus, the load bearing capacity of the joint can be deteriorated than that of the conventional six ball type joint.

In the conventional cross groove joint of higher ball (e.g., eight ball) type as shown in FIG. 4, the strength of the cage is greatly influenced by the skew angles $\delta 11$ and $\delta 33$. As the skew angles $\delta 11$ and $\delta 33$ of the grooves for the outer and inner joint members increase, the ball movement L22 in circumferential direction becomes longer, and as a consequence, the size of the cage window 44a must also be enlarged to accommodate the ball movement of the ball 22a in the window. As a result, the thickness of the cage web 44b decreases, and causes to weaken the strength of the cage web while deteriorating the load bearing capacity of the joint. Therefore, there is a need to improve the design of the higher ball (e.g., eight ball) type cross groove joint in order to make the durability of the joint to be equivalent to that of the conventional six ball type joint described above.

FIG. 5 illustrates a conventional eight-ball type cross groove joint which is articulated by joint angle $\theta$ and with the grooves of the outer and inner joint members 11 and 33 skewed at the same skew angle $\delta$. The cross groove joint is configured to have the skewed grooves of the outer and inner joint members play the role of a cam to move the retaining balls inwardly and outwardly while the balls are placed in a plane bisecting the joint angle $\theta$. As shown in FIG. 5(*b*), when the cross groove joint is articulated by an arbitrary joint angle $\theta$ which equals twice the skew angle $\delta$, the ball groove 11c and the ball groove 11g of the outer joint member, that are positioned in the articulating plane (i.e., at 3 o'clock and 9 o'clock directions in FIG. 5(*a*)) of the joint, become aligned with the ball groove 33c and the ball groove 33g of the inner joint member, respectively. Due to the aligned grooves 11c/33c and 11g/33g, the thrust force for pushing the retaining balls 22c and 22g in an outward or inward direction becomes lost, and as a result, the two balls 22c and 22g positioned in the parallel grooves 11c/33c and 11g/33g can be temporarily locked or stalled in the grooves. This temporary locking risk of the balls (to be referred hereinafter as a "ball locking" problem or a "ball locking" phenomenon) can cause the potential drawback of unstable or unsmooth operation of the joint.

In order to avoid the potential ball locking problem, one possible way is designing the joint to have the maximum joint angle of the joint limited to a degree less than twice the skew angle $\delta$ of the grooves. However, this provides undue design limitations for the cross groove joint, in particular, for the conventional high ball type cross groove joint, which already includes certain design limitations contemplated to maintain the strength of the cage to be equivalent to that of the six-ball type joint, as described above. For instance, the skew angle of the ball grooves in the eight-ball joint is typically limited to be less than that of the six-ball joint in order not to deteriorate the strength of the cage web as described above. Thus, it will cause additional design limitations if it is necessary to make the maximum joint angle of the eight-ball joint to be less than twice the skew angle $\delta$ of the grooves.

SUMMARY OF THE INVENTION

In order to solve the above described and other shortcomings or drawbacks known in the conventional cross groove joints, the present invention provides a cross groove joint (preferably, but not necessarily, of higher ball type) with a compact and durable structure, in particular, with the strength of the cage web enhanced than that of the conventional cross groove joints as described above. The present invention also provides a cross groove joint, preferably of higher ball type, which can avoid or reduce the potential ball locking problem in the joint.

In order to provide an enhanced strength to the cage web of the cross groove joint, the present invention provides a cross groove joint including an outer joint member with a plurality of inwardly facing ball grooves and an inner joint member with a plurality of outwardly facing ball grooves, in which the shapes of the ball grooves of the outer and inner joint members are configured to increase the thickness and also the mechanical strength of the cage web as compared to the conventional cross groove joint as described above.

The mechanical strength and durability of the cage is influenced by skew angle $\delta$ (see FIGS. 4-5, for example). As the skew angle $\delta$ of the ball grooves for the outer and inner joint members 11 and 33 increases, the ball movement L22 in circumferential direction increases and the size of cage window 44a should also increase to accommodate the ball movement in the movement range. As a consequence, the thickness of cage web 44b between two adjacent windows 44a becomes smaller as the skew angle of the grooves for the inner and outer joint member increases.

In consideration of all the factors described above, the applicant of the present application discovered several effective ways to reduce the ball movements and the size of cage windows in the cross groove joint (preferably, of the type having eight or more balls) by decreasing or optimizing the skew angle and also optimizing the shapes of the ball grooves. For example, U.S. patent application Ser. No. 12/563,029, filed Sep. 18, 2009 by the same applicants of the present application, suggests several examples of the constant velocity joints which incorporate composite groove patterns (for example, such as a combination of liner and non-linear grooves, or of skewed grooves and non-linear grooves) to the ball grooves of the outer and inner joint members to provide an enhanced strength and durability to the cage web as comparing to the conventional cross groove type joint. Moreover, U.S. patent application Ser. No. 12/582,602, filed Oct. 20, 2009 by the same applicants of the present application, suggests several other examples of the constant velocity joints which incorporate different groove patterns or configurations to also provide an enhanced strength and durability to the cage web as comparing to the conventional cross groove type joint. In one example as illustrated in FIG. 5 of U.S. patent application Ser. No. 12/582,602, a larger skew angle ($\delta 1$) is adopted to the first group of four ball grooves (which are displaced to one another with a phase angle of 90 degree) for the outer and inner joint members 11 and 33, and a smaller skew angle ($\delta 2$) is adopted to the second group of remaining four ball grooves (which are also displaced to one another with a phase angle of 90 degree) for the outer and inner joint members 11 and 33. In this manner, as the second skew angle $\delta 2$ is selected to have an angle less than the first skew angle $\delta 1$ which is in turn selected to be the same or similar to the normal skew angle (i.e., $\delta$ in FIG. 4), the minimum effective thickness LL of the outer and inner joint members 11 and 33 becomes larger than the minimum effective thickness L11 of the conventional cross groove joint of FIG. 4. Accordingly in this example, the size of cage windows can be reduced and the thickness of cage webs (44b) can be enlarged, and as a result, the strength and durability of the cage web (44b) is increased as compared to the conventional cross groove type joint.

However, the present applicants have recognized that this example may have a potential risk to be involved in the ball locking problem in the joint. Although the larger skew angle ($\delta1$) adopted to the first group of four ball grooves can be selected to an angle larger than one half of the maximum joint angle to avoid the potential ball locking problem, the smaller skew angle ($\delta2$) adopted to the second group of remaining four ball grooves can become smaller than one half of the maximum joint angle, and thus, causing the balls therein to be locked as the joint is articulated.

Accordingly, in order to solve this potential ball locking risk, the present application provides a cross groove type constant velocity joint with groove shapes and configurations of the ball grooves of the outer and inner joint members further modified, while also having the strength and durability enhanced as compared to the conventional cross groove joint.

According to one aspect of the present invention, the cross groove joint is a higher ball type joint with eight or more balls, and the skew angles of the joint are minimized to secure the strength of its cage webs to be equivalent to that of the six ball type joint, and the shapes and configurations of the ball grooves are modified or optimized in order to reduce the potential ball locking problem which can be occurring as the joint is articulated to an arbitrary joint angle.

According to one preferred embodiment of the invention, a cross groove type constant velocity joint for a drive system comprises:

an outer joint member having a plurality of inwardly facing outer ball grooves, the outer ball grooves consisting of a first group of grooves, each groove of which having a linear groove shape with no skew angle, and a second group of grooves, each groove of which having a skewed groove shape with a skew angle other than zero and alternately arranged in opposite directions relative to an axis of rotation of outer joint member;

an inner joint member disposed inside the outer joint member and having a plurality of outwardly facing inner ball grooves consisting of a first group of grooves, each groove of which having a linear groove shape with no skew angle, and a second group of grooves, each groove of which having a skewed groove shape with a skew angle other than zero and alternately arranged in opposite directions relative to an axis of rotation of inner joint member; wherein each inner ball groove of the first group of grooves of the inner joint member is coupled with a corresponding outer ball groove of the first group of grooves of the outer joint member generally in paralleled pair, wherein each inner ball groove of the second group of grooves of the inner joint member is coupled with a corresponding outer ball groove of the second group of grooves of the outer joint member generally in crossed pair, and wherein each pair of grooves of the first group of grooves of the outer and inner joint members define a taper angle;

a plurality of torque transfer balls which are guided by the ball grooves of the outer and inner joint members; and a cage having circumferentially displaced windows to accommodate the balls therein.

According to another preferred embodiment of the invention, a cross groove type constant velocity joint for a drive system comprises:

an outer joint member having a plurality of inwardly facing outer ball grooves, the outer ball grooves consisting of a first group of grooves, each groove of which having a skewed groove shape with a first skew angle other than zero and alternately arranged in opposite directions relative to an axis of rotation of outer joint member, and a second group of grooves, each groove of which having a skewed groove shape with a second skew angle other than zero and alternately arranged in opposite directions relative to an axis of rotation of outer joint member, the first skew angle being less than the second skew angle;

an inner joint member disposed inside the outer joint member and having a plurality of outwardly facing inner ball grooves consisting of a first group of grooves, each groove of which having a skewed groove shape with a first skew angle other than zero and alternately arranged in opposite directions relative to an axis of rotation of inner joint member, and a second group of grooves, each groove of which having a skewed groove shape with a second skew angle other than zero and alternately arranged in opposite directions relative to an axis of rotation of inner joint member, the first skew angle being less than the second skew angle; wherein each inner ball groove of the first group of grooves of the inner joint member is coupled with a corresponding outer ball groove of the first group of grooves of the outer joint member generally in crossed pair, wherein each inner ball groove of the second group of grooves of the inner joint member is coupled with a corresponding outer ball groove of the second group of grooves of the outer joint member generally in crossed pair, and wherein each pair of grooves of the first group of grooves of the outer and inner joint members define a taper angle;

a plurality of torque transfer balls which are guided by the ball grooves of the outer and inner joint members; and a cage having circumferentially displaced windows to accommodate the balls therein.

According to another preferred embodiment of the invention, a cross groove type constant velocity joint for a drive system comprises:

an outer joint member having a plurality of inwardly facing outer ball grooves, the outer ball grooves consisting of a first group of grooves, each groove of which having a skewed groove shape with a skew angle other than zero and alternately arranged in opposite directions relative to an axis of rotation of outer joint member, and a second group of grooves, each groove of which having a skewed groove shape with a skew angle other than zero and alternately arranged in opposite directions relative to an axis of rotation of outer joint member;

an inner joint member disposed inside the outer joint member and having a plurality of outwardly facing inner ball grooves consisting of a first group of grooves, each groove of which having a skewed groove shape with a skew angle other than zero and alternately arranged in opposite directions relative to an axis of rotation of inner joint member, and a second group of grooves, each groove of which having a skewed groove shape with a skew angle other than zero and alternately arranged in opposite directions relative to an axis of rotation of inner joint member; wherein each inner ball groove of the first group of grooves of the inner joint member is coupled with a corresponding outer ball groove of the first group of grooves of the outer joint member generally in crossed pair, wherein each inner ball groove of the second group of grooves of the inner joint member is coupled with a corresponding outer ball groove of the second group of grooves of the outer joint member generally in crossed pair, and wherein each pair of grooves of the outer and inner joint members define a taper angle;

a plurality of torque transfer balls which are guided by the ball grooves of the outer and inner joint members; and a cage having circumferentially displaced windows to accommodate the balls therein.

BRIEF DESCRIPTION OF THE DRAWINGS

The above described and other objects, features and advantages of the present invention will be more apparent from the presently preferred embodiments of the invention disclosed in the following description and illustrated in the accompanying drawings, in which.

DETAILED DESCRIPTION OF THE INVENTION

Figure 1A:
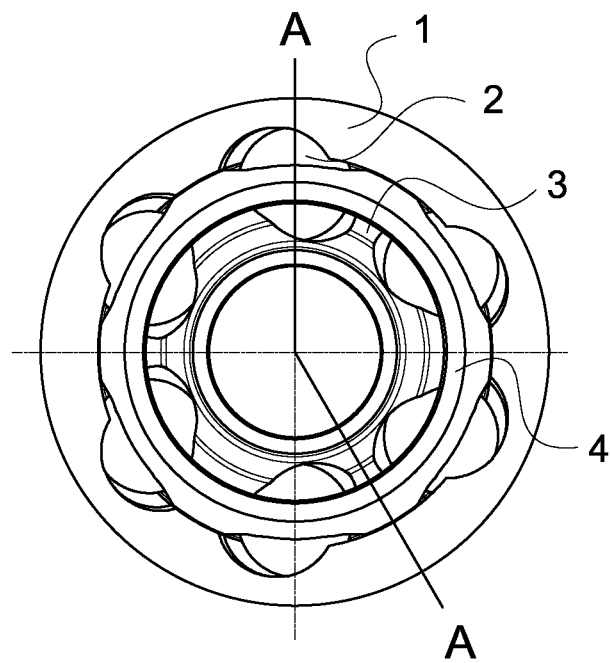
FIG. 1(a) is a view illustrating a conventional cross groove joint retaining six balls therein.
Figure 1B:
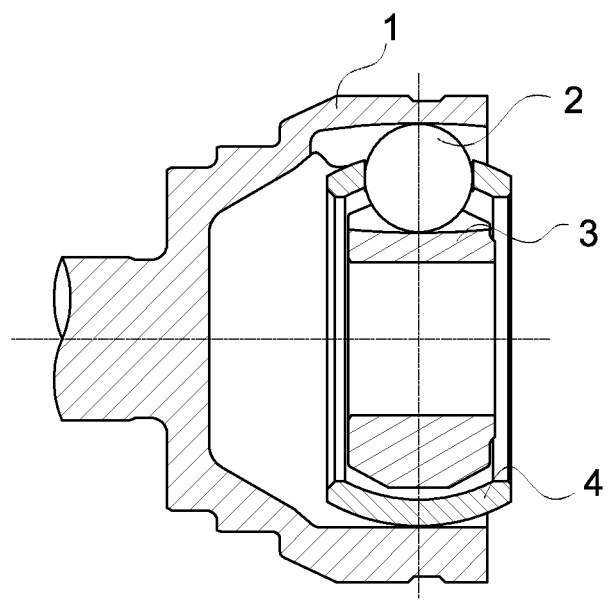
FIG. 1(b) is a cross-sectional view of the conventional cross groove joint as shown in FIG. 1(a), taken along line A-A in the figure.

The present invention will be explained and illustrated below in association with several embodiments to be described later, in particular, the cross groove joint of eight ball type. However, it is specifically noted that the present invention is not limited to the eight ball type joint, but is applicable to the cross groove joint of any ball type, for example, having six, eight, ten, or more balls.

Referring to FIGS. 6-9 of the drawings, the cross groove type constant velocity joints of the present invention are described herein in details in association with several exemplary or preferred embodiments thereof. However, the following descriptions of such embodiments are intended primarily for illustrating the principles and exemplary constructions of the constant velocity joints of the present invention, and the present invention is not specifically limited to these exemplary embodiments. Thus, one skilled in the art can appreciate or recognize that various modifications and substitutions can be made thereto without departing from the spirit and scope of the present invention.

Throughout the description of the present application, common or similar elements are to be referred with the same or similar reference characters for simplicity purposes.

As described below in details, the cross groove joint of the present invention is preferably a higher ball type joint containing eight or more balls, and the average skew angle of the joint, calculated from the entire grooves, is minimized to secure the strength of its cage webs to be similar or equivalent to that of the six ball type joint although the number of retaining balls is increased. In addition, the shapes and configurations of the ball grooves are modified or optimized in order to reduce the potential ball locking problem which can be occurring as the joint is articulated to an arbitrary joint angle in operation.

Figure 4:
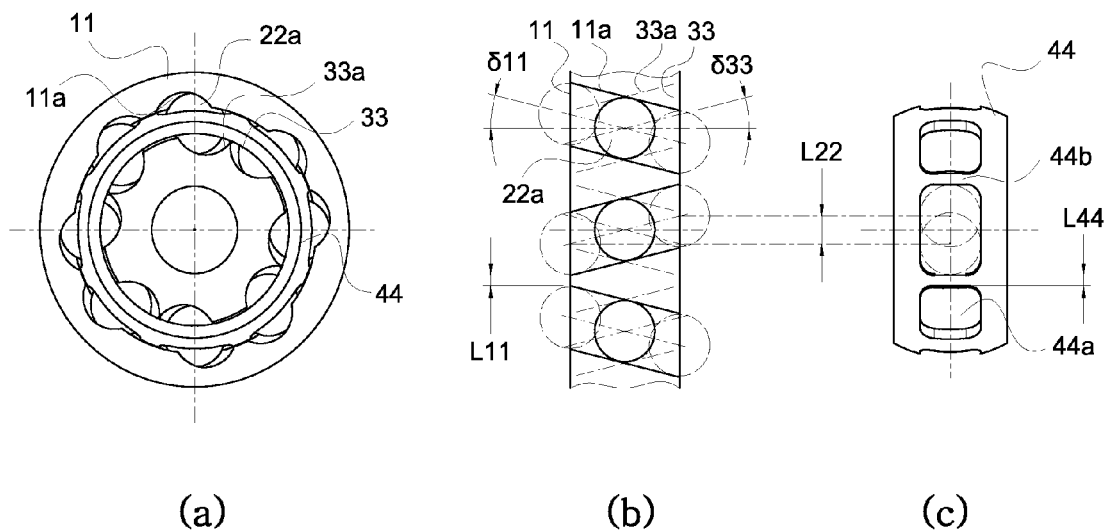
FIGS. 4(a)-4(c) are, respectively, a view of a conventional cross groove joint with eight balls, a partial side development (i.e., deployed or radially projected) view thereof for illustrating the shapes of the ball grooves in the outer and inner joint members and movements of the balls in the grooves, and a partial side view for illustrating movements of the balls in the cage.
Figure 5A:
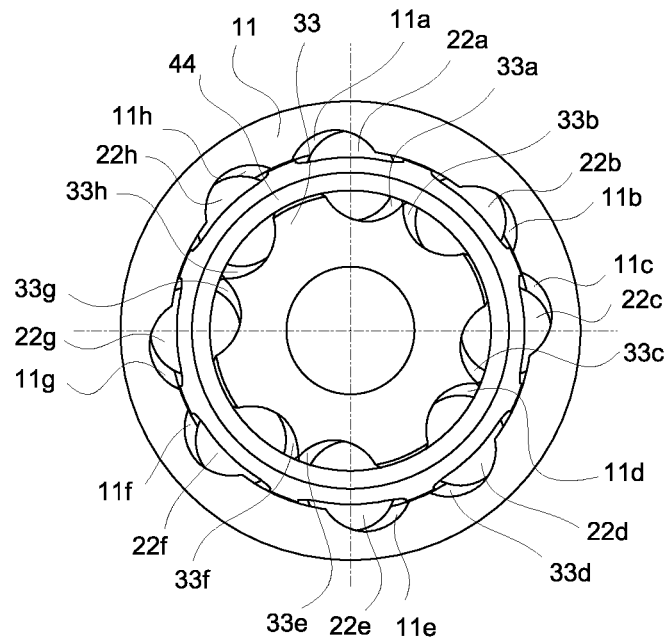
FIGS. 5(a) and 5(b) are, respectively, a view of the conventional cross groove joint with eight balls, and a side view thereof with the joint articulated by a joint angle θ for illustrating the effect of the joint angle θ to the movement of the ball received in the ball groove skewed by a skew angle (δ)
Figure 5B:
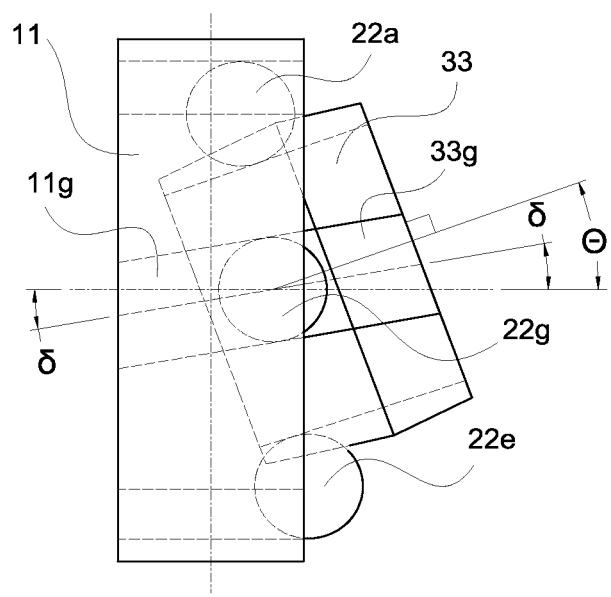
Figure 6:
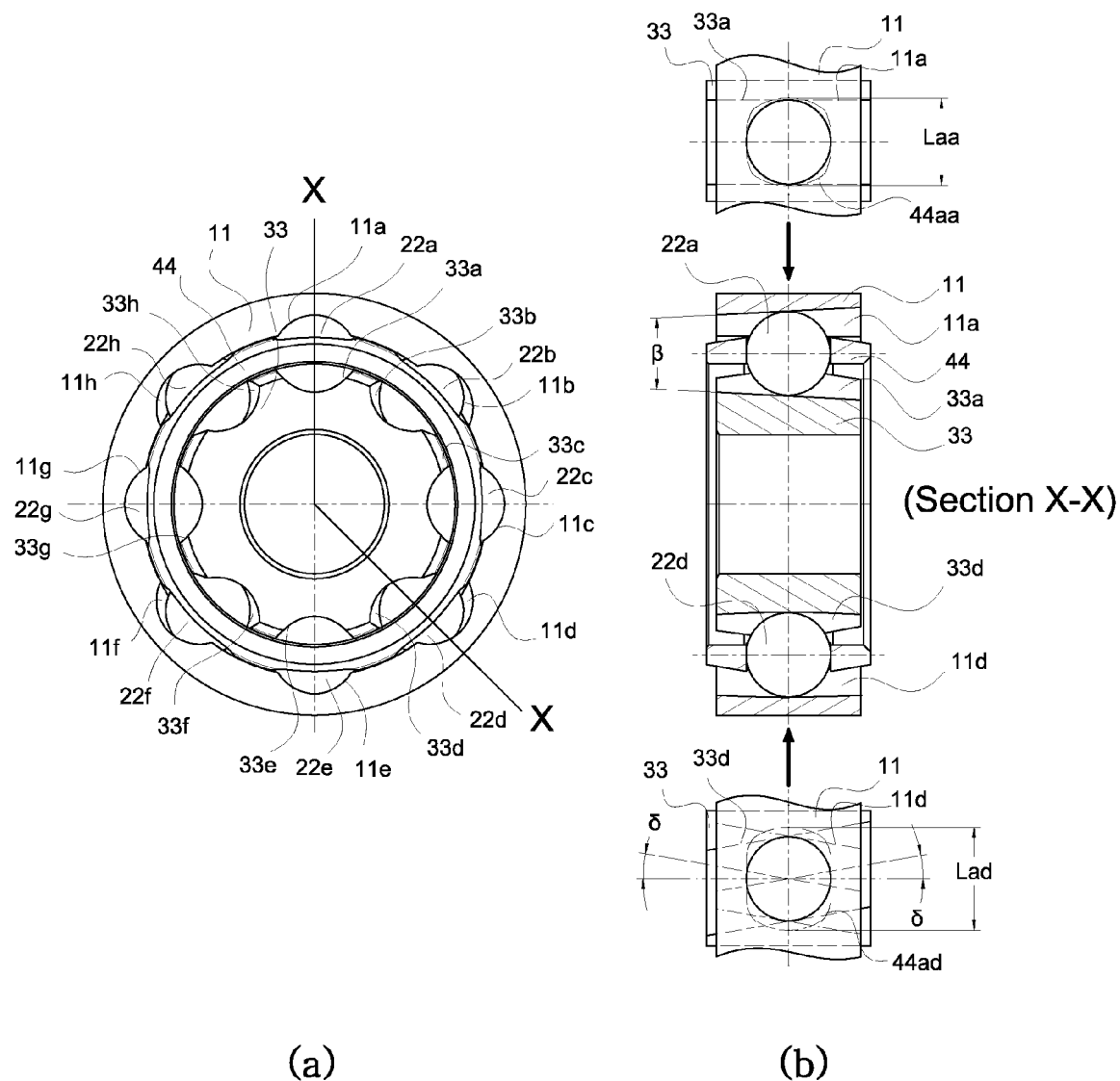
FIG. 6(a) illustrates a view of the cross groove type constant velocity joint with eight balls, constructed according to a first embodiment of the present invention.
FIG. 6(b) illustrates a side cross-sectional view of the cross groove joint of FIG. 6(a), taken along line X-X in the figure, along with two partial side views thereof for illustrating the ball groove configurations in first and second groups of grooves, respectively.
Figure 7A:
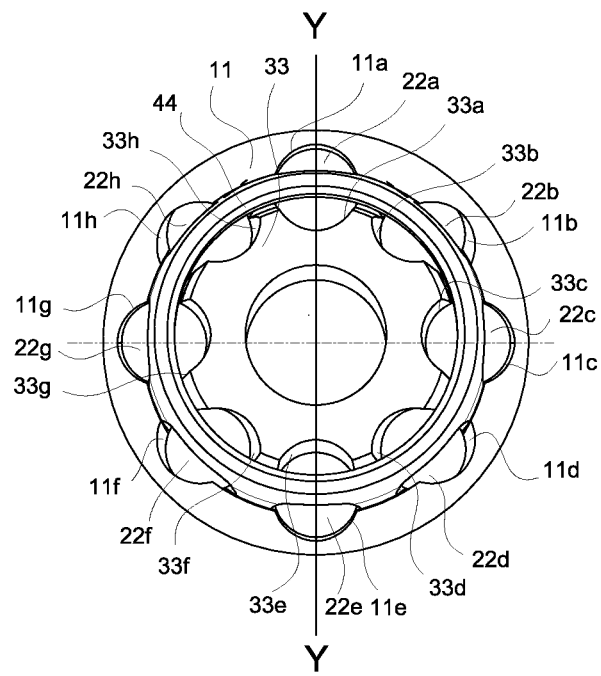
FIG. 7(a) is a view of the cross groove type constant velocity joint of the first embodiment of the present invention, which is similar to FIG. 6(a)
Figure 7B:
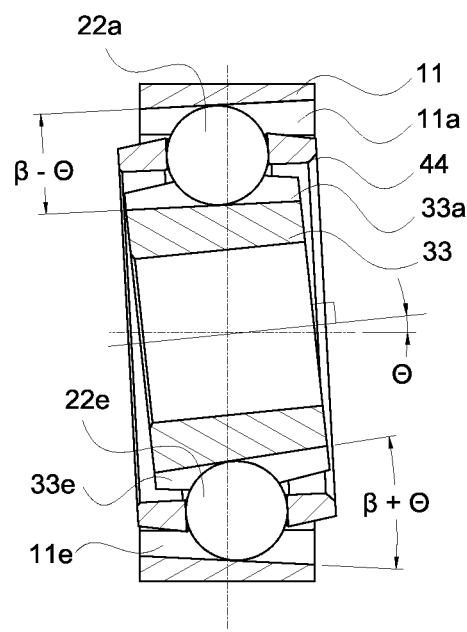
FIG. 7(b) illustrates a side cross-sectional view of the cross groove joint of FIG. 7(a), taken along line Y-Y in the figure, for illustrating the joint which is articulated by a joint angle θ.

With reference to FIGS. 6-7, a first preferred embodiment of the present invention is described below in details. In this embodiment, the cross groove joint includes an outer joint member 11 having a plurality of (i.e., eight) inwardly facing outer ball grooves 11a-11h, and an inner joint member 33 placed inside the outer joint member 11 and having a plurality of (i.e., eight) outwardly facing inner ball grooves 33a-33h. The corresponding outer and inner ball grooves 11a-11h and 33a-33h face each other in pairs with each of the eight balls 22a-22h retained between each pair for torque transfer between the inner and outer joint members 11 and 33. The cross groove joint further includes a cage 44 containing eight cage windows 44aa-44ah for retaining the balls therein and to transmit the rotational torque between the outer and inner joint members as is similar to that shown in FIG. 4. However, unlike the conventional cross groove joint (as shown in FIG. 4) which has the grooves alternately disposed in opposite directions with the same inclination angle δ11 and δ33, the ball grooves 11a-11h and 33a-33h of the outer and inner joint members have different groove shapes and configurations as shown in FIG. 6(b).

More specifically, in the present embodiment the shapes of the ball grooves are differentiated in two groups as illustrated in FIG. 6. In particular, a first group of grooves, namely, four ball grooves 11a, 11c, 11e, 11g of the outer joint member 11 (displaced to each other with the phase angle of 90 degree) and four ball grooves 33a, 33c, 33e, 33g of the inner joint member 33 (displaced to each other with the phase angle of 90 degree) each have a linear groove with no skew angle, and are coupled with each other in paralleled pairs. In addition, in order to avoid the potential ball locking (to be described below in further details), each pair of grooves of the first group of grooves is configured to have a taper angle β (see FIG. 6(b)) of suitable degree depending on the design of the joint, which is preferably between about 0.1° and about 5°, more preferably between about 0.1° and about 2°. On the other hand, a second group of grooves, namely, the remaining four ball grooves 11*b*, 11*d*, 11*f*, 11*h* of the outer joint member 11 and the remaining four ball grooves 33*b*, 33*d*, 33*f*, 33*h* of the inner joint member 33 each have a skewed groove with a skew angle δ, and are alternately arranged in opposite directions in crossed pairs. However, contrary to the first group of grooves, each pair of grooves of the second group of grooves does not have any taper angle β.

Figure 2:
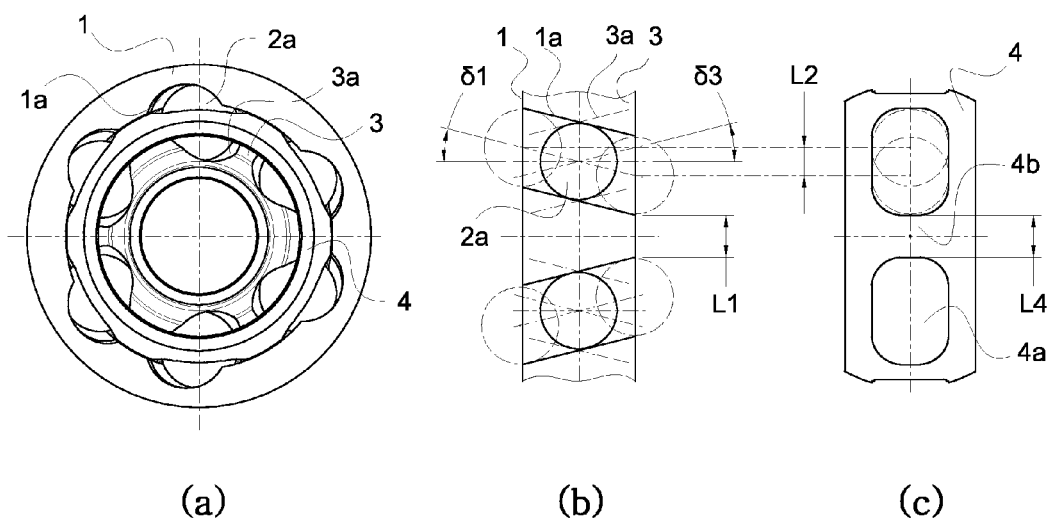
FIGS. 2(a)-2(c) are, respectively, a view of a conventional cross groove joint with six balls, a partial side view thereof for illustrating the shapes of the ball grooves in the outer and inner joint members and movements of the balls in the grooves, and a partial side view for illustrating movements of the balls in the cage.
Figure 3A:
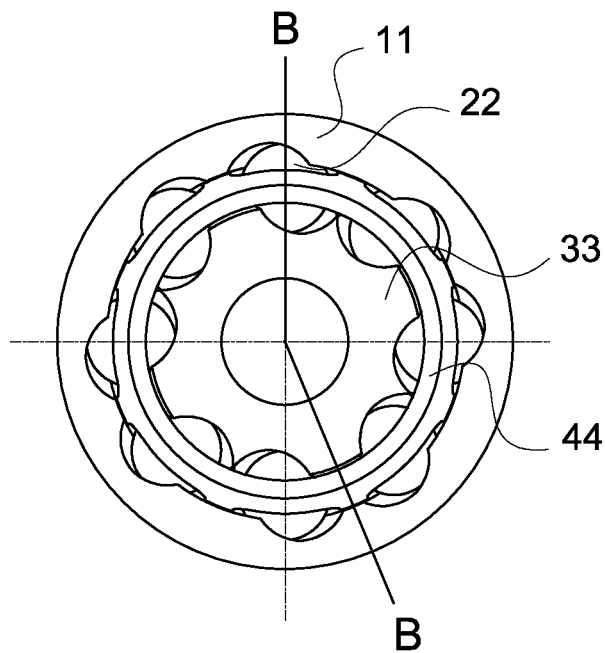
FIG. 3(a) is a view illustrating a conventional cross groove joint retaining eight balls therein.
Figure 3B:
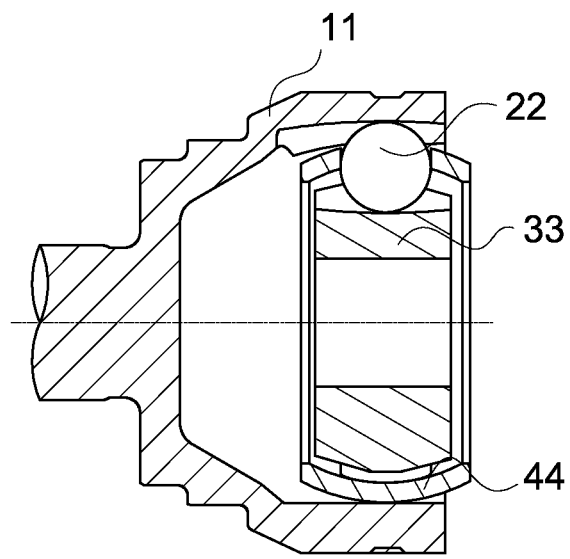
FIG. 3(b) is a cross-sectional view of the conventional cross groove joint as shown in FIG. 3(a), taken along line B-B in the figure.

The skew angle δ of the second group is selected to have an angle generally the same as or similar to the conventional skew angle δ1 (see FIG. 2) of the six-ball cross groove joint, and is also generally the same as or similar to the skew angle δ11 and δ33 (see FIG. 4) of the conventional cross groove joint. In one preferred example, the skew angle δ of the second group is selected to be in the range between about 10° and about 20°.

According to the first embodiment of the invention described above, due to the differentiated groove configuration, which is combined with one set of grooves of a skewed groove configuration (with the skew angle equivalent to or similar to that of the conventional six ball or eight ball type joint) and another set of grooves of a liner configuration with no skew angle, the minimum thickness (the least effective thickness) of the outer and inner joint members 11 and 33 can be increased than the minimum thickness (e.g., L11 in FIG. 4) of the conventional cross groove joint. As a result, due to the grooves of the linear grooves, the size "Laa" of its cage windows can be reduced, while enlarging the thickness of cage webs as compared to the conventional joint as shown in FIG. 4, for example. Accordingly, the cross groove joint of the present embodiment is effective to enhance the mechanical strength and durability of the joint as compared to the conventional cross groove joint.

Moreover, the first embodiment of the invention can also effectively reduce the potential ball locking risk as described herein. In particular, the grooves of the second group (i.e., 11*b*/33*b*, 11*d*/33*d*, 11*f*/33*f*, 11*h*/33*h*) are free from the ball locking risk since the skew angle δ is designed to have an angle greater than the threshold degree of the potential ball locking problem, that is, one half of the maximum joint angle θ of the cross groove joint. As described above, the skew angle δ is selected to be in a range between about 10° and about 20°, and the maximum joint angle θ is typically about 2°-20°. Thus, the skew angle δ is greater than one half of the maximum joint angle θ, and this satisfies the requirement to avoid the potential ball locking problem.

The ball locking risk is, however, more vulnerable at the grooves of the first group (i.e., 11*a*/33*a*, 11*c*/33*c*, 11*e*/33*e*, 11*g*/33*g*). When the joint angle is zero as shown in FIG. 6(*b*), the grooves of the first group can avoid the ball locking due to the taper angle β which can function to bias the balls to be pulled out of the ball locking. However, when the joint angle θ is present as shown in FIG. 7(*b*), ball locking may occur when the groove 11*a* of outer joint member 11 is aligned with the groove 33*a* of inner joint member 33 at 12 o'clock phase angle as the joint angle θ reaches to the point which equals the taper angle β. It is, however, noted that such ball locking does not occur with the groove 11*e*/33*e* located at 6 o'clock direction. Notwithstanding the occurrence of potential ball locking at 12 o'clock phase angle, the ball located at 6 o'clock position is pulling out due to the funnel angle (β+θ) which is twice the taper angle β as θ equals β. Accordingly, the ball located at 12 o'clock direction is pulled out of ball locking instantly by the pulling force produced by the ball located at 6 o'clock direction.

It is further noted that, considering the load concentration applying to the cage window located at 6 o'clock direction, the taper angle β is selected to be preferably between about 0.1° and about 2°.

As described above, due to the differentiated groove configurations in the first and second group of grooves, the cross groove joint of the first embodiment is effective to enhance the mechanical strength of the cage as compared to the conventional cross groove joint, while is also capable of effectively reducing the potential risk of ball locking in operation.

Figure 8:
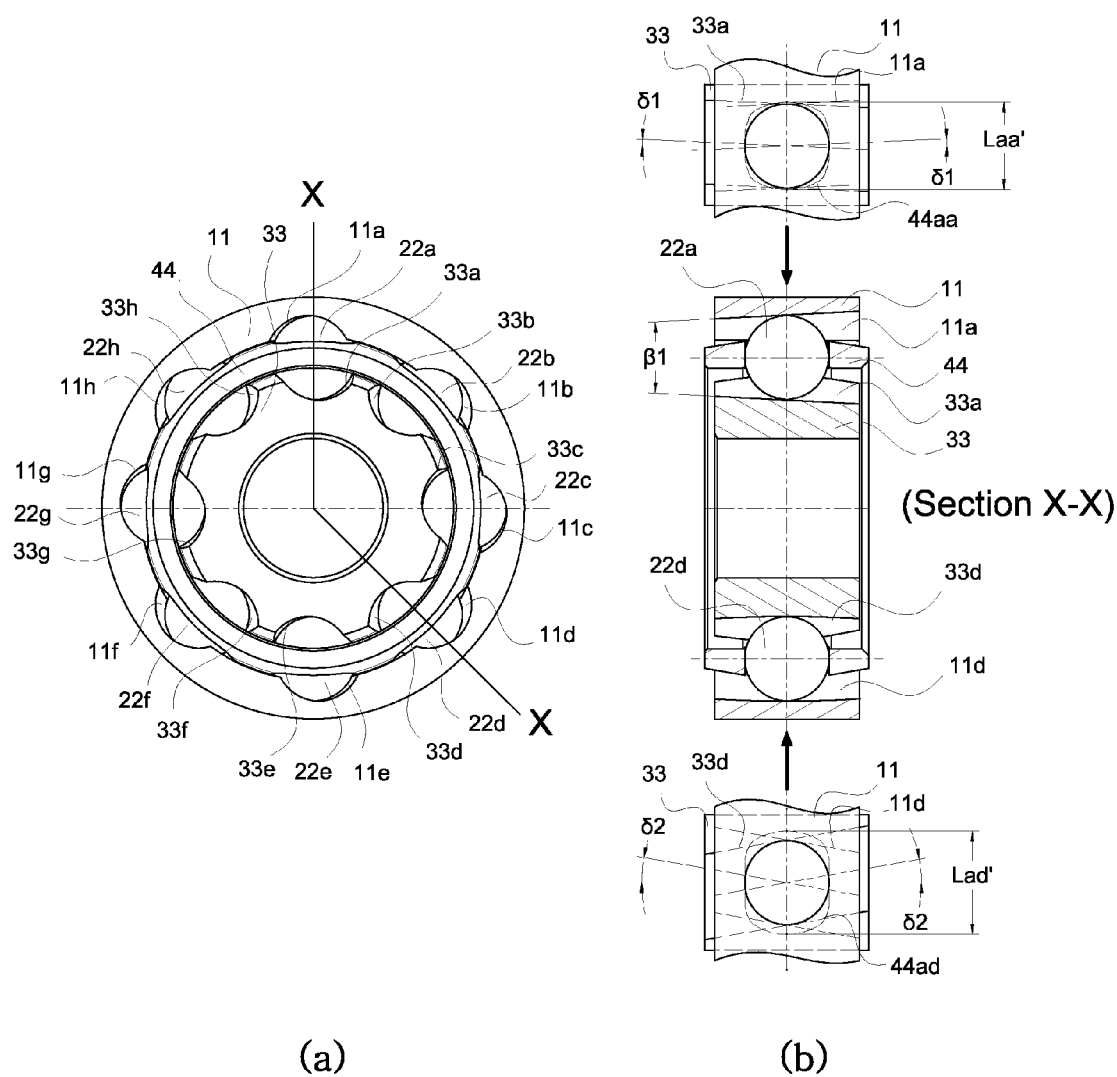
FIG. 8(a) illustrates a view of the cross groove type constant velocity joint with eight balls, constructed according to a second embodiment of the present invention.
FIG. 8(b) illustrates a side cross-sectional view of the cross groove joint of FIG. 8(a), taken along line X-X in the figure, along with two partial side views thereof for illustrating the ball groove configurations in first and second groups of grooves, respectively.
Figure 9:
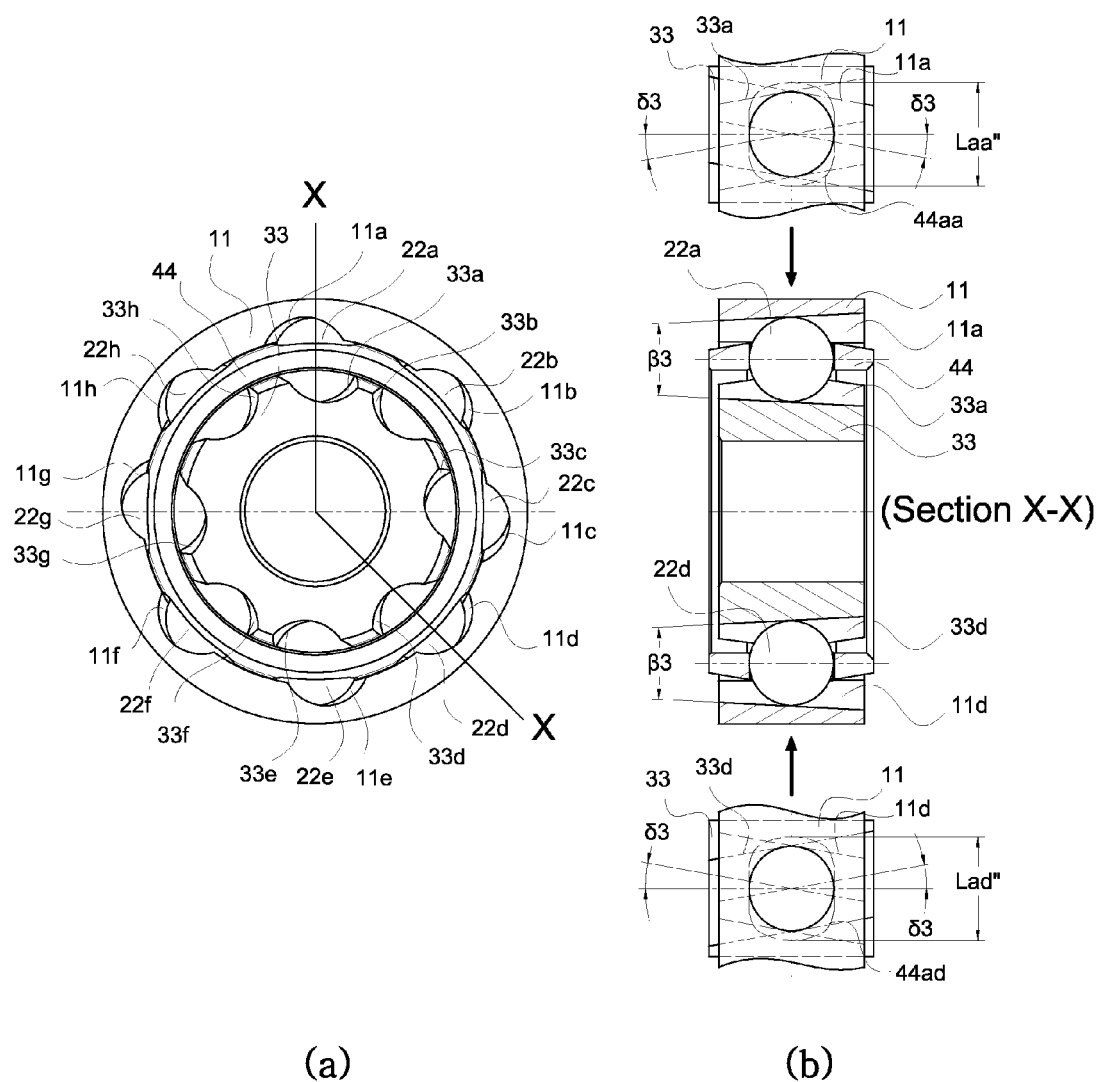
FIG. 9(a) illustrates a view of the cross groove type constant velocity joint with eight balls, constructed according to a third embodiment of the present invention.
FIG. 9(b) illustrates a side cross-sectional view of the cross groove joint of FIG. 9(a), taken along line X-X in the figure, along with two partial side views thereof for illustrating the ball groove configurations in first and second groups of grooves, respectively.

With reference to FIGS. 8(*a*) and 8(*b*), a second preferred embodiment of the present invention is described below in details. Except that described below, the basic structure of this joint is similar to that described and shown in association with the first embodiment of FIGS. 6-7 above, and detailed descriptions regarding to the common elements and structure of this embodiment are to be omitted herein for simplicity purposes, and to be referred above.

As is similar to the previous embodiment of FIGS. 6-7, and unlike the conventional cross groove joint as shown in FIG. 4 (which has the grooves alternately disposed in opposite directions with the same inclination angle δ), the ball grooves 11*a*-11*h* and 33*a*-33*h* of the outer and inner joint members of the present embodiment have differentiated shapes or configurations as described below.

More specifically, in the present embodiment the shapes of the ball grooves are differentiated in two groups as illustrated in FIG. 8. In particular, a first group of grooves, namely, four ball grooves 11*a*, 11*c*, 11*e*, 11*g* of the outer joint member 11 (displaced to each other with the phase angle of 90 degree) and four ball grooves 33*a*, 33*c*, 33*e*, 33*g* of the inner joint member 33 (displaced to each other with the phase angle of 90 degree) each have a skewed groove with a first skew angle δ1, and the ball grooves are alternately arranged in opposite directions in crossed pairs. In addition, in order to avoid the potential ball locking, each pair of grooves for the first group of grooves is configured to have a taper angle 131 (see FIG. 8(*b*)) of suitable degree depending on the design of the joint, which is preferably between about 0.1° and about 10°, more preferably between about 0.1° and about 5°. On the other hand, a second group of grooves, namely, the remaining four ball grooves 11*b*, 11*d*, 11*f*, 11*h* of the outer joint member 11 and the remaining four ball grooves 33*b*, 33*d*, 33*f*, 33*h* of the inner joint member 33 each have a skewed groove with a larger skew angle δ2, which are alternately arranged in opposite directions in crossed pairs. However, contrary to the first group of grooves, each pair of grooves of the second group of grooves does not have any taper angle β1.

The skew angle δ1 is selected to be in a range between about 0° and about 2°, more preferably between about 0.1° and about 1°, and the skew angle δ2 is selected to have an angle generally the same as or similar to the regular skew angle δ1 (see FIG. 2) of the six-ball cross groove joint, and is generally the same as or similar to the skew angle δ11 and δ33 (see FIG. 4) of the conventional cross groove joint. In one preferred example, the skew angle δ2 is selected to be in the range between about 10° and about 20°.

According to the second embodiment of the invention described above, due to the differentiated groove configuration, which is combined with one set of grooves of a regularly-skewed groove (with a skew angle equivalent to or similar to that of the conventional six ball or eight ball type joint) and another set of grooves of a smaller-skewed groove (with a skew angle relatively smaller than the regularly-skewed groove), the minimum thickness (the least effective thickness) of the outer and inner joint members 11 and 33 can be increased than the minimum thickness (e.g., L11 in FIG. 4) of the conventional cross groove joint. As a result, due to the grooves of the smaller-skewed grooves, the size Laa' of its cage windows can be reduced, while enlarging the thickness of cage webs as compared to the conventional joint as shown in FIG. 4, for example. Accordingly, the cross groove joint of the present embodiment is effective to enhance the mechanical strength and durability of the joint as compared to the conventional cross groove joint.

Moreover, the second embodiment of the invention can effectively avoid the ball locking risk as described herein. In particular, the grooves of the second group (i.e., 11b/33b, 11d/33d, 11f/33f, 11h/33h) are free from the ball locking risk since the skew angle δ is selected to have an angle greater than the threshold degree of the potential ball locking problem, that is, one half of the maximum joint angle θ of the cross groove joint. As described above, the skew angle δ2 is selected to be in a range between about 10° and about 20°, and the maximum joint angle θ is typically about 2°-20°. Thus, the skew angle δ is greater than one half of the maximum joint angle θ, and this satisfies the requirement to avoid the potential ball locking problem.

As described above, the ball locking risk is typically more vulnerable at the grooves of the first group (i.e., 11a/33a, 11c/33c, 11e/33e, 11g/33g). However, in the present embodiment, the grooves of the first group can also avoid the potential ball locking problem due to the combination of the taper angle β1 and the skew angle δ1. This is because there is no occasion that the groove of outer joint member 11 is to be aligned with the groove of inner joint member 33 even when joint angle θ is present, owing to the presence of the additional skew angle δ1. It is further noted that, considering the load concentration applying to the cage window located at 6 o'clock direction, the taper angle β1 is selected to be preferably between about 0.1° about 5°, and the skew angle δ1 is preferably between about 0.1° and about 1°.

As described above, due to the differentiated groove configurations in the first and second group of grooves, the cross groove joint of the second embodiment is also effective to enhance the mechanical strength of the cage as compared to the conventional cross groove joint, while is also capable of effectively avoiding the potential risk of ball locking in operation.

With reference to FIGS. 9(a) and 9(b), a third preferred embodiment of the present invention is described below in details. The present embodiment includes common or similar features as that of the previous embodiments as described above in connection with FIGS. 6-8. However, the outer and inner joint members of the present embodiment also include different features and/or further modifications as described below.

More specifically, unlike the previously described embodiments of FIGS. 6-8, the shapes of all of the ball grooves of the present embodiment have the same groove configuration. In particular, as illustrated in FIG. 9(b), the grooves for all eight ball grooves 11a-11h of the outer joint member 11 (displaced to each other with the phase angle of 45 degree) and the grooves for all eight ball grooves 33a-33h of the inner joint member 33 (displaced to each other with the phase angle of 45 degree) each have a skewed groove with a skew angle δ3 of moderate or medium degree, and the ball grooves are alternately arranged in opposite directions in crossed pairs. In addition, in order to effectively avoid the potential ball locking, each pair of the grooves is configured to have a taper angle β3 (see FIG. 9(b)) of suitable degree depending on the design of the joint, which is preferably between about 0.1° and about 10°, more preferably between about 0.1° and about 5°.

In one preferred example, the skew angle δ3 is selected to be in the range between about 1° and about 15° which is generally smaller than the regular skew angle of the conventional cross groove joint, that is, about 10-20°. However, the skew angle δ3 is generally larger than the smaller skew angle δ1 of FIG. 8. In another preferred example, the skew angle δ3 is selected to be in the range between about 2° and about 10°.

According to the third embodiment of the invention described above, as the grooves of the outer and inner joint members have the skew angle δ3 (which is less than the regular skew angle of the conventional cross groove joint), the minimum thickness (the least effective thickness) of the outer and inner joint members 11 and 33 can be increased than the minimum thickness (e.g., L11 in FIG. 4) of the conventional cross groove joint. As a result, due to the grooves of the smaller-skewed grooves, the size Laa' of its cage windows can be reduced, while enlarging the thickness of cage webs as compared to the conventional joint as shown in FIG. 4, for example. Accordingly, the cross groove joint of the present embodiment is also effective to enhance the mechanical strength and durability of the joint as compared to the conventional cross groove joint.

Moreover, the third embodiment of the invention can also effectively avoid the ball locking risk as described herein. In particular, the grooves of the outer and inner joint members can avoid the potential ball locking problem due to the combination of the taper angle β3 and the skew angle δ3. This is because there is no occasion that the groove of outer joint member 11 is to be aligned with the groove of inner joint member 33 even when joint angle θ is present, owing to the presence of the additional skew angle δ3. It is further noted that, considering the load concentration applying to the cage window located at 6 o'clock direction, the taper angle β3 is selected to be preferably about 0.1° and about 10°, more preferably between about 0.1° and about 5°.

As described above, the cross groove joint of the third embodiment is also effective to enhance the mechanical strength of the cage as compared to the conventional cross groove joint, while is also capable of effectively avoiding the potential risk of ball locking in operation.

As described above in connection with several exemplary embodiments thereof, in order to provide an enhanced strength to the cage web and the cross groove joint, the present invention provides a cross groove joint including an outer joint member with a plurality of inwardly facing ball grooves and an inner joint member with a plurality of outwardly facing ball grooves, in which the shapes of the ball grooves of the outer and inner joint member are configured to increase the thickness and the mechanical strength of the cage web as compared to the conventional cross groove joint, in particular, by applying different and/or reduced skew angles to the ball grooves of the cross groove joint, namely, by applying a regular skew angle to the first group of grooves and a reduced skew angle to the second group of grooves (i.e., the first and second embodiments), or alternatively, by applying a medium-degree skew angle to all the grooves of the joint (i.e., the third embodiment). Moreover, the potential risk of ball locking is also effectively resolved by applying a taper angle to the pair of grooves of at least one or both of the first and second groups of grooves.

The present invention is described and illustrated above in connection with several embodiments for cross groove joints retaining eight balls. However, it is noted that the present invention is not limited to the eight ball type joints, but is applicable to the cross groove joint of any ball type, more preferably of higher ball type having eight, ten, or more balls, while making the structures and configurations (such as the skew angles and taper angles, etc.) suitably modified to meet the design requirements thereof.

The above disclosed embodiments of the invention are representatives of a presently preferred form of the invention, but are intended to be illustrative rather than definitive thereof. Accordingly, those skilled in the art will appreciate or recognize that various modifications and substitutions can be made thereto without departing from the spirit and scope of the present invention as set forth in the appended claims.

What is claimed is:

1. A constant velocity joint for a drive system comprising:
    an outer joint member having a plurality of inwardly facing outer ball grooves, the outer ball grooves consisting of a first group of grooves, each groove of which having a linear groove shape with no skew angle, and a second group of grooves, each groove of which having a skewed groove shape with a skew angle other than zero and alternately arranged in opposite directions relative to an axis of rotation of outer joint member;
    an inner joint member disposed inside the outer joint member and having a plurality of outwardly facing inner ball grooves consisting of a first group of grooves, each groove of which having a linear groove shape with no skew angle, and a second group of grooves, each groove of which having a skewed groove shape with a skew angle other than zero and alternately arranged in opposite directions relative to an axis of rotation of inner joint member; wherein each inner ball groove of the first group of grooves of the inner joint member is coupled with a corresponding outer ball groove of the first group of grooves of the outer joint member generally in paralleled pair, wherein each inner ball groove of the second group of grooves of the inner joint member is coupled with a corresponding outer ball groove of the second group of grooves of the outer joint member generally in crossed pair, wherein each pair of grooves of the first group of grooves of the outer and inner joint members define a taper angle other than zero, and wherein each pair of grooves of the second group of grooves of the outer and inner joint members define no taper angle;
    a plurality of torque transfer balls which are guided by the ball grooves of the outer and inner joint members; and
    a cage having circumferentially displaced windows to accommodate the balls therein.

2. The constant velocity joint of claim 1, wherein the number of the torque transfer balls is an even number.

3. The constant velocity joint of claim 1, wherein the first group of grooves of the outer and inner joint members, respectively, consist of four ball grooves displaced to one another with a phase angle of 90 degree, and the second group of grooves of the outer and inner joint members, respectively, consist of four ball grooves displaced to one another with a phase angle of 90 degree.

4. The constant velocity joint of claim 1, wherein the skew angle of the second group of grooves of the outer joint member and the skew angle of the second group of grooves of the inner joint member are selected to be in the range between about 10 degree and about 20 degree, and wherein the taper angle of the first group of grooves is selected to be in the range between about 0.1 degree and about 5 degree.

5. A constant velocity joint for a drive system comprising:
    an outer joint member having a plurality of inwardly facing outer ball grooves, the outer ball grooves consisting of a first group of grooves, each groove of which having a skewed groove shape with a first skew angle other than zero and alternately arranged in opposite directions relative to an axis of rotation of outer joint member, and a second group of grooves, each groove of which having a skewed groove shape with a second skew angle other than zero and alternately arranged in opposite directions relative to an axis of rotation of outer joint member, the first skew angle being less than the second skew angle;
    an inner joint member disposed inside the outer joint member and having a plurality of outwardly facing inner ball grooves consisting of a first group of grooves, each groove of which having a skewed groove shape with a first skew angle other than zero and alternately arranged in opposite directions relative to an axis of rotation of inner joint member, and a second group of grooves, each groove of which having a skewed groove shape with a second skew angle other than zero and alternately arranged in opposite directions relative to an axis of rotation of inner joint member, the first skew angle being less than the second skew angle; wherein each inner ball groove of the first group of grooves of the inner joint member is coupled with a corresponding outer ball groove of the first group of grooves of the outer joint member generally in crossed pair, wherein each inner ball groove of the second group of grooves of the inner joint member is coupled with a corresponding outer ball groove of the second group of grooves of the outer joint member generally in crossed pair, wherein each pair of grooves of the first group of grooves of the outer and inner joint members define a taper angle other than zero, and wherein each pair of grooves of the second group of grooves of the outer and inner joint members define no taper angle;
    a plurality of torque transfer balls which are guided by the ball grooves of the outer and inner joint members; and
    a cage having circumferentially displaced windows to accommodate the balls therein.

6. The constant velocity joint of claim 5, wherein the number of the torque transfer balls is an even number.

7. The constant velocity joint of claim 5, wherein the first group of grooves of the outer and inner joint members, respectively, consist of four ball grooves displaced to one another with a phase angle of 90 degree, and the second group of grooves of the outer and inner joint members, respectively, consist of four ball grooves displaced to one another with a phase angle of 90 degree.

8. The constant velocity joint of claim 5, wherein the skew angle of the first group of grooves of the outer joint member and the skew angle of the first group of grooves of the inner joint member are selected to be in the range between about 0 degree and about 2 degree, wherein the skew angle of the second group of grooves of the outer joint member and the skew angle of the second group of grooves of the inner joint member are selected to be in the range between about 10 degree and about 20 degree, and wherein the taper angle of the first group of grooves is selected to be in the range between about 0.1 degree and about 10 degree.

* * * * *